United States Patent
Lannert

[11] 3,887,616
[45] June 3, 1975

[54] HYDROXY ETHER CARBOXYLATES

[75] Inventor: Kent P. Lannert, Freeburg, Ill.

[73] Assignee: Monsanto Company, St. Louis, Mo.

[22] Filed: Dec. 19, 1973

[21] Appl. No.: 426,158

[52] U.S. Cl.............. 260/535 P; 252/132; 252/142; 252/156; 252/180; 260/343.6; 260/473 A; 260/484 P; 260/501.1; 260/501.17; 260/514 K; 260/521 P
[51] Int. Cl............................................ C07c 59/12
[58] Field of Search......... 260/535 P, 501.1, 501.17, 260/343.6, 514 K, 484 P, 521 P

[56] References Cited
FOREIGN PATENTS OR APPLICATIONS

| | | | |
|---|---|---|---|
| 785,632 | 12/1972 | Belgium............................ | 260/535 P |
| 2,248,708 | 4/1973 | Germany.......................... | 260/535 P |

Primary Examiner—Lorraine A. Weinberger
Assistant Examiner—Paul J. Killos
Attorney, Agent, or Firm—Thomas N. Wallin; J. E. Maurer; Neal E. Willis

[57] ABSTRACT

Hydroxy ether carboxylates represented by the formula

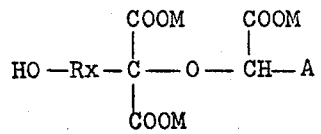

wherein A is hydrogen, methyl or ethyl; M is alkali metal, ammonium, alkyl ammonium or alkanol ammonium and Rx is

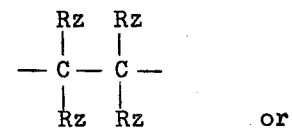

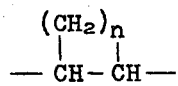

$n$ being an integer from 4 to 10 and Rz being hydrogen, alkyl, phenyl, phenyl alkyl, alkoxy alkyl, alkoxy phenyl, alkoxy phenyl alkyl or —COOM are useful as complexing agents and/or detergency builders. The ester and acid forms of these compounds are useful as intermediates for their preparation.

5 Claims, No Drawings

HYDROXY ETHER CARBOXYLATES

BACKGROUND OF THE INVENTION

This invention relates to novel hydroxy ether carboxylate salts useful as complexing agents and/or detergency builders and to ester and acid forms of such compounds useful as intermediates for their preparation.

The utility of compounds characterized by the ability to complex various metal and alkaline earth metal ions (particularly ions such as calcium ions which contribute to "hardness" of water) in aqueous media and/or provide, in combination with various detergent surfactants, detergent formulations of enhanced cleansing ability is well recognized by those skilled in the art. Such compounds are used in water treating applications (e.g. to "soften" water) and/or as detergency builders.

Although many compounds having complexing and/or detergency builder functionality are known, the provision of novel compounds composed of only carbon, hydrogen and oxygen and having such functionality is desirable.

SUMMARY OF THE INVENTION

It is an object of this invention to provide novel compounds useful as complexing agents and/or detergency builders and intermediates for the synthesis of such compounds.

The compounds of this invention are hydroxy ether polycarboxylic acids, salts and esters whose structure, synthesis, and use will be understood from the following description of the preferred embodiments.

DESCRIPTION OF THE PREFERRED EMBODIMENTS

The compounds of the present invention are represented by the formula

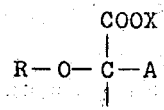

wherein R is

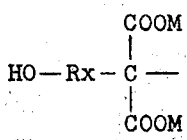

or

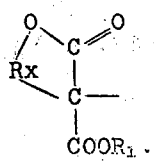

In the above formula: A is hydrogen, methyl, or ethyl; M is alkali metal, ammonium, alkyl ammonium containing one to four carbon atoms or alkanol ammonium containing one to four carbon atoms; X is M when R is

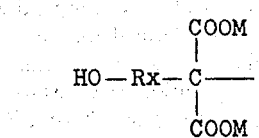

and is hydrogen or an alkyl group containing from one to 20 carbon atoms when R is

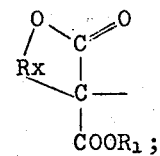

$R_1$ is hydrogen or an alkyl group containing from one to 20 carbon atoms; Rx is

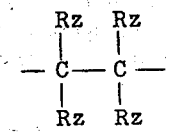

or

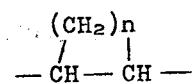

$n$ being an integer from 4 to 10, Rz is hydrogen, alkyl, phenyl, phenyl alkyl, alkoxy alkyl, alkoxy phenyl, alkoxy phenyl alkyl or COOX; and the total number of carbon atoms in Rx is from two to 22. The above definitions of the moieties constituting the compounds of this invention are intended as individual rather than collective. That is, for example, all Rz substituents need not be identical.

Hereinafter in this application, parenthetical subscripts "$e$," "$a$" or "$s$" may be used to indicate that the ester, acid or salt forms, respectively, of various moieties are intended. For example, the designation $-Rz(e)$ indicates that if Rz is COOX, X will be an alkyl group.

It will be apparent that the compounds in which R is

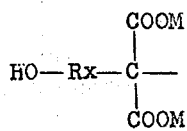

are salt forms of the compounds of this invention whereas the compounds wherein R is

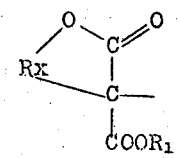

are the acid ($R_1$ and X are hydrogen) or ester ($R_1$ and X are alkyl groups) forms.

The salt forms are useful as complexing agents for metal and alkaline earth metal ions and/or as detergency builders. The ester and acid forms are useful as intermediates for preparation of the salts.

In general, those compounds wherein Rx is

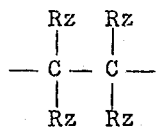

are preferred, the compounds wherein a Rz substituent on the carbon atom adjacent to the hydroxy group or the heterocyclic oxygen is an alkyl group, or, preferably, hydrogen and the remaining Rz substituents are hydrogen being particularly preferred from the viewpoint of the complexing ability of the salts on a molecular weight basis and the economy of synthesis of the acid and ester forms.

Certain compounds of the invention have hydrate forms having utility corresponding to that of the unhydrated forms. For example, a preferred sodium salt

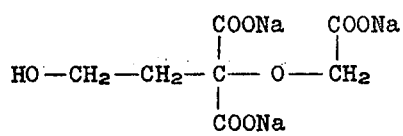

forms a monohydrate. Accordingly, the claims hereinafter presented to the compounds disclosed herein are intended to encompass both hydrated and unhydrated forms thereof.

To prepare the ester forms of the compounds of this invention, an epoxide of the formula (I) 

is reacted with a malonic ester of the formula (II) 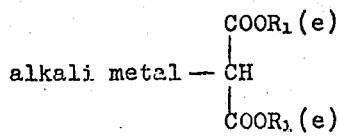

Epoxides containing the Rx moiety desired for the compound being synthesized can be prepared by known techniques described, for example, in Weissberger, *Heterocyclic Compounds with Three and Four Membered Rings*, Part One, pages 1–523, (Interscience Publishers, 1964) and Maliworskii, *Epoxides and Their Derivatives* (Daniel Davey and Co., Inc., 1965) and the various references cited in these publications.

The reaction is conveniently conducted in a mutual solvent for the epoxide (I) and ester (II) which is not adversely reactive with these reactants or the reaction product (the alcohol corresponding to the ester (II) is generally satisfactory) at a temperature of from 0° to 60° C, preferably 40° to 45° C.

The reaction yields (III) 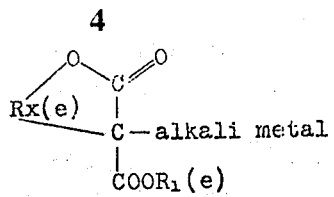

which is acidified (preferably with acetic acid) to yield (IV) 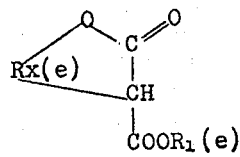

This compound (IV) is bromonated or chlorinated with elemental bromine or sulfuryl chloride to yield a halolactone (V) 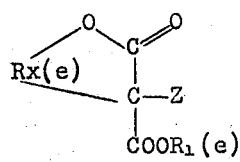

(Z is bromine or chlorine). The halolactone (V) is reacted usually at temperatures of 0° to 100° C in solvent for (V) which is not adversely reactive with reactants or reaction products (e.g. tetrahydrofuran, ether, etc.) with an alkali metal salt (VI) 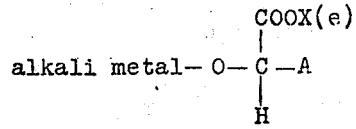

(which is prepared by reaction of an α-hydroxy ester of desired structure with alkali metal or alkali metal hydride in an inert medium such as tetrahydrofuran, ethyl ether, etc., which is a solvent for the α-hydroxy ester) to yield the ester form of the compounds of this invention.

(VII) 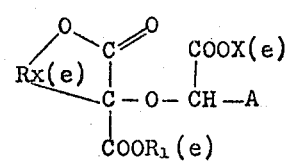

Alternately, the halolactone (V) can be converted to a salt (IX) 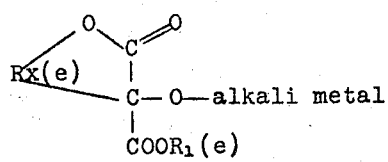

by treating the halolactone (V) with alkali metal hydroxide in an alcoholic or aqueous medium to yield

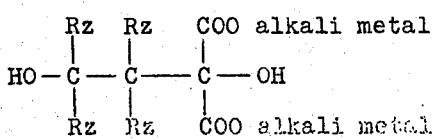

which is re-esterified to the lactone form by conventional procedures and reacted with alkali metal or alkali metal hydride in an inert medium which is a solvent for the ester, e.g., tetrahydrofuran, ether, etc. The salt is then reacted with a haloester (X)
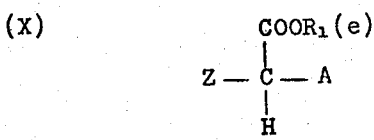

(at 0°–100° C in a solvent for (X) which is not adversely reactive with reactants or reaction products, e.g., tetrahydrofuran, ethyl ether, etc.) to yield the ester form (VII) of the compounds of this invention.

The alkali metal salt forms of the compounds of this invention are prepared either by saponifying the ester forms or neutralizing the acid forms with an alkali metal hydroxide.

The salt can be converted to the acid by treatment with a strong acid, e.g., HCl, $H_2SO_4$ or a strong acid ion exchange resin.

The ammonium and alkanol ammonium salt forms of the invention are obtained by treating the acid with ammonia, an alkyl amine, alkanol amine or hydroxides thereof.

The mechanism of epoxide ring opening in the above described processes will favor formation of products wherein the Rz groups attached to the carbon atom adjacent to the heterocyclic oxygen (and, ultimately, the hydroxy group) are of larger spatial configuration than the Rz groups attached to the next carbon atom. However, all possible products will be formed. That is, if the epoxide

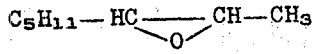

and the α-hydroxy ester salt

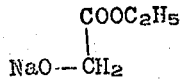

are utilized in the above described reactions, the salt product of the invention ultimately obtained will be a mixture of a major proportion of

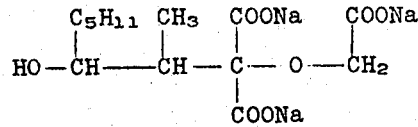

and a minor proportion of

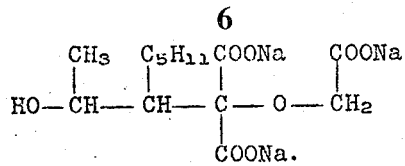

such mixtures may be utilized as such or separated by conventional techniques.

The hydroxy ether polycarboxylate salts of this invention are useful as agents for complexing metal and/or alkaline earth metal ions in aqueous media. The amount of polycarboxylate required to effectively complex the ions in a given system will depend, to some extent, on the particular polycarboxylate salt being used and the particular metal or alkaline earth metal ions in the aqueous media. Generally, complexing is more effective in basic solution. Optimum conditions and amounts of complexing agent can readily be determined by routine experimentation.

The hydroxy ether polycarboxylate salts are also useful as builders in detergent formulations. Generally, the use of the alkali metal salts, particularly the sodium salt is preferred. However, in some formulations (such as liquid formulations where greater builder solubility is required) the use of ammonium or alkanol ammonium salts may be desirable.

The detergent formulations will contain at least 1% by weight and preferably at least 5% by weight of the hydroxy ether polycarboxylate salts of this invention. In order to obtain the maximum advantages of the builder compositions of this invention, the use of from 5% to 75% of these polycarboxylate salts is particularly preferred. The hydroxy ether polycarboxylate salt compounds of this invention can be the sole detergency builder or these compounds can be utilized in combination with other detergency builders which may constitute from 0 to 95% by weight of the total builders in the formulation. By way of example, builders which can be employed in combination with the novel builder compounds of this invention include water soluble inorganic builder salts such as alkali metal polyphosphates, i.e., the tripolyphosphates and pyrophosphates, alkali metal carbonates, borates, bicarbonates and silicates and water soluble organic builders including amino polycarboxylic acids and salts such as alkali metal nitrilotriacetates, cycloalkane polycarboxylic acids and salts, other ether polycarboxylates, alkyl polycarboxylates, epoxy polycarboxylates, tetrahydrofuran polycarboxylates such as 1,2,3,4 or 2,2,5,5 tetrahydrofuran tetracarboxylates, benzene polycarboxylates, oxidized starches, amino (trimethylene phosphonic acid) and its salts, diphosphonic acids and salts (e.g., methylene diphosphonic acid; 1-hydroxy ethylidene diphosphonic acid) and the like.

The detergent formulations will generally contain from 5% to 95% by weight total builder (although greater or lesser quantities may be employed if desired) which, as indicated above, may be solely the hydroxy ether polycarboxylate salt compounds of this invention or mixture of such compounds with other builders. The total amount of builder employed will be dependent on the intended use of the detergent formulation, other ingredients of the formulation, pH conditions and the like. For example, general laundry powder formulations will usually contain 20% to 60% builder; liquid dishwashing formulations 11% to 12% builder; machine dishwashing formulations 60% to 90% builder.

Optimum levels of builder content as well as optimum mixtures of builders of this invention with other builders for various uses can be determined by routine tests in accordance with conventional detergent formulation practice.

The detergent formulations will generally contain a water soluble detergent surfactant although the surfactant ingredient may be omitted from machine dishwashing formulations. Any water soluble anionic, nonionic, zwitterionic or amphoteric surfactant can be employed.

Examples of suitable anionic surfactants include soaps such as the salts of fatty acids containing about nine to 20 carbon atoms, e.g., salts of fatty acids derived from coconut oil and tallow; alkyl benzene sulfonates—particularly linear alkyl benzene sulfonates in which the alkyl group contains from 10 to 16 carbon atoms; alcohol sulfates; ethoxylated alcohol sulfates; hydroxy alkyl sulfonates; alkyl sulfates and sulfonates; olefin sulfonates; alkenyl sulfonates; monoglyceride sulfates; acid condensates of fatty acid chlorides with hydroxy alkyl sulfonates and the like.

Examples of suitable nonionic surfactants include alkylene oxide (e.g., ethylene oxide) condensates of mono and polyhydroxy alcohols, alkyl phenols, fatty acid amides, and fatty amines; amine oxides; sugar derivatives such as sucrose monopalmitate; long chain tertiary phosphine oxides; dialkyl sulfoxides, fatty acid amides, (e.g., mono or diethanol amides of fatty acids containing 10 to 18 carbon atoms), and the like.

Examples of suitable zwitterionic surfactants include derivatives of aliphatic quaternary ammonium compounds such as 3-(N,N-dimethyl-N-hexadecylammonio) propane-1-sulfonate and 3-(N,N-dimethyl-N-hexadecylammonio)-2-hydroxy propane-1-sulfonate.

Examples of suitable amphoteric surfactants include betains, sulfobetains and fatty acid imidazole carboxylates and sulfonates.

It will be understood that the above examples of surfactants are by no means comprehensive and that numerous other surfactants are known to those skilled in the art. It will be further understood that the choice and use of surfactants will be in accordance with well understood practices of detergent formulation. For example, anionic surfactants, particularly linear alkyl benzene sulfonate are preferred for use in general laundry formulations, whereas low foaming nonionic surfactants are preferred for use in machine dishwashing formulations.

The quantity of surfactant employed in the detergent formulations will depend on the surfactant chosen and the end use of the formulation. In general, the formulations will contain from 5% to 50% surfactant by weight, although as much as 95% or more surfactant may be employed if desired. For example, general laundry powder formulations normally contain 5% to 50%, preferably 15% to 25% surfactant; machine dishwashing formulations .5% to 5%; liquid dishwashing formulations 20% to 45%. The weight ratio of surfactant to builder will generally be in the range of from 1:12 to 2:1.

In addition to builder and surfactant components, detergent formulations may contain fillers such as sodium sulfate and minor amounts of bleaches, dyes, optical brighteners, soil anti-redeposition agents, perfumes and the like.

In machine dishwashing compositions the surfactant will be a low-foaming nonionic or anionic, preferably nonionic surfactant which will constitute 0 to 5% of the formulation.

The term "low-foaming" surfactant connotes a surfactant which, in the foaming test described below, reduces the revolutions of the washer jet-spray arm during the wash and rinse cycles less than 15%, preferably less than 10%.

In the foaming test, 1.5 grams of surfactant is added to a 1969 Kitchen-Aid Home Dishwasher, Model No. KOS-16, manufactured by Hobart Manufacturing Company which is provided with means for counting revolutions of the washer jet-spray arm during wash and rinse cycles. The machine is operated using distilled water feed at a machine entrance temperature of 40° C. The number of revolutions of the jetspray arm during the wash and rinse cycles is counted. The results are compared with those obtained by operation of the machine using no surfactant charge, and the percentage decrease in number of revolutions is determined.

The surfactant should, of course, be compatible with the chlorine containing component hereinafter discussed. Examples of suitable nonionic surfactants include ethoxylated alkyl phenols, ethoxylated alcohols (both mono- and di-hydroxy alcohols), polyoxyalkylene glycols, aliphatic polyethers and the like. The widely commercially utilized condensates of polyoxypropylene glycols having molecular weights of from about 1,400 to 2,200 with ethylene oxide (the ethylene oxide constituting 5 to 35 weight percent of the condensate) are, for example, advantageously used in the machine dishwashing formulations of this invention.

Suitable low-foaming anionic surfactants include alkyldiphenyl ether sulfonates such as sodium dodecyl diphenyl ether disulfonates and alkyl naphthalene sulfonates.

Mixtures of suitable low-foaming surfactants can be utilized if desired.

In addition, machine dishwashing formulations will contain sufficient chlorine providing compound to provide 0.5% to 2% available chlorine. For example, the formulation may contain from 0.5% to 5%, preferably 1% to 3% of a chlorocyanurate or from 10% to 30% chlorinated trisodium phosphate. Suitable chlorocyanurates are sodium and potassium dichlorocyanurate; [(mono-trichloro) tetra-(mono-potassium dichloro)] penta-isocyanurate; (mono-trichloro) (mono-potassium dichloro) di-isocyanurate.

Machine dishwashing compositions should additionally contain from 5% to 30% soluble sodium silicate having an $SiO_2$ to $Na_2O$ mole ratio of from 1:1 to 3.2:1 preferably about 2.4:1 to inhibit corrosion of metal parts of dishwashing machines and provide over-glaze protection to fine china.

Machine dishwashing compositions will generally contain at least 10%, preferably at least 20% builder, up to a maximum of about 90% builder. The new builder compounds of this invention should constitute at least 5% of the weight of the machine dishwashing formulation in order to obtain the full effects of their inherent characteristics.

The invention is further illustrated by the following examples, wherein all parts and percentages are by weight unless otherwise indicated.

EXAMPLE I

Metallic sodium (44 gms.) is added to 900 ml. ethanol after which 320 gms. of diethyl malonate is added to form an ethanol slurry of sodium diethyl malonate. A solution of 88 gms. ethylene oxide in 300 ml. ethanol is added to the slurry, the temperature being maintained between 40°–45° C, to form a slurry of

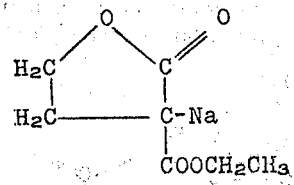

Following addition of the ethylene oxide, the slurry is stirred for 15 hours, at room temperature after which 120 ml. of glacial acetic acid is added to form

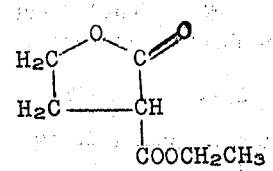

The ethanol is removed under reduced pressure, 500 ml. water is added to dissolve the sodium acetate and the organic phase is separated, dissolved in ether, washed with water, dried over MgSO$_4$—CaSO$_4$ and the ether evaporated.

Sixty-six grams of

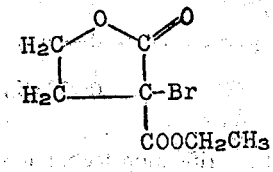

is dissolved in 75 ml. carbon tetrachloride and bromine added at reflux temperature to form

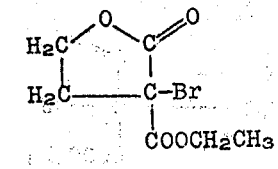

which is separated by evaporating the chloroform, dissolving in ether and washing with 5% NaHCO$_3$, saturated NaCl and water after which the ethereal solution is dried and the ether evaporated.

Forty grams of ethyl glycolate in 50 ml. tetrahydrofuran is added to a slurry of about 8.6 gms. sodium hydride in 300 ml. tetrahydrofuran and the mixture stirred for 1 hour at about 35° C to form a slurry of

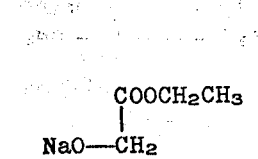

This slurry is cooled to about 10° C and a solution of 84 gms.

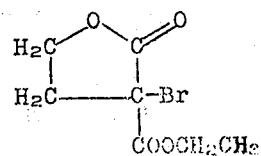

in 50 ml. tetrahydrofuran is added, the temperature being maintained at about 10° C. After 1 hour, the temperature is raised to 25° C and maintained at that level for 14 hours. The tetrahydrofuran is evaporated, the residue diluted with ether and washed with water, dried, and the ether evaporated. The residue is distilled, the product

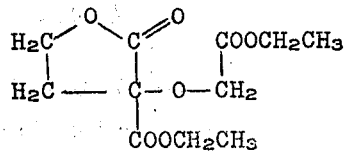

being collected at 123°–125° C/0.1 mm Hg.

EXAMPLE II

A solution of 37 gms. of

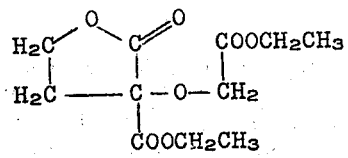

in 45 ml. ethanol is added slowly to 75 gms. of an aqueous 25% sodium hydroxide solution maintained below 40° C with an ice bath. The mixture is then stirred for about 4 hours at about 25° C and an aqueous solution of

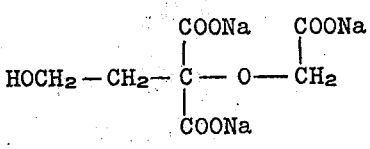

is separated. Successive washing with ethanol and acetone separates the salt as a solid product. This salt is tested for sequestration function using the procedures described by Matzner et al, "Organic Builder Salts as Replacements for Sodium Tripolyphosphate," *Tenside Detergents*, 10, Heft 3, pages 119–125 (1973). The sequestration value (intensity multiplied by capacity expressed as a percentage of sodium tripolyphosphate sequestration value) is 100%.

EXAMPLE III

A 25% aqueous solution of

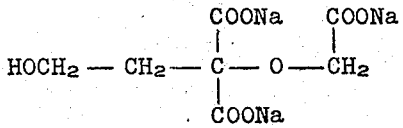

is passed through a column packed with strong acid ion exchange resin (sulfonated polystyrene marketed by Fisher Scientific Company under the trademark Rexyn 101) to yield

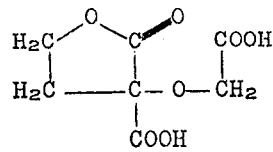

which is reacted with ammonium hydroxide to yield

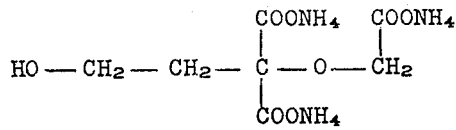

EXAMPLE IV

Detergent formulations containing 25%, 37.5%, and 50%,

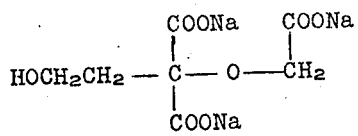

17% linear alkylbenzene sulfonate having an average molecular weight of about 230; 6% sodium silicate and a quantity of sodium sulfate sufficient to equal 100% are prepared. Those formulations are found to clean cotton and polyester/cotton fabrics substantially more effectively than otherwise identical compositions in which the

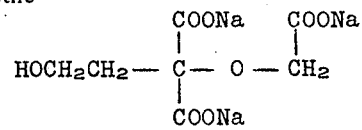

is replaced with a "filler," sodium sulfate.

EXAMPLE V

The compound

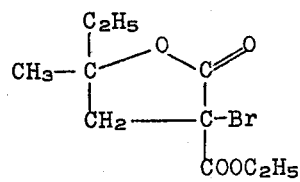

is prepared by reacting 86 gms. of

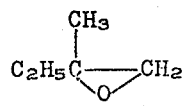

and 182 gms. of

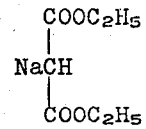

followed by acidification and bromination in accordance with the procedure of Example I. Stirring 140 gms. of

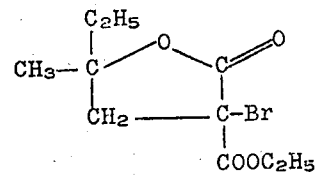

with 350 gms. of 25% aqueous KOH at a temperature of 40°–45° C for about 24 hours yields the salt

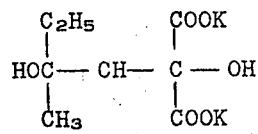

which is esterified to the hydroxy ester lactone

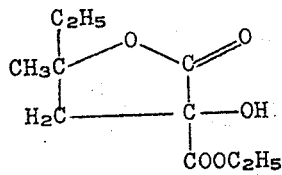

by conventional esterification techniques and purified by vacuum distillation.

Seventy-two gms. of

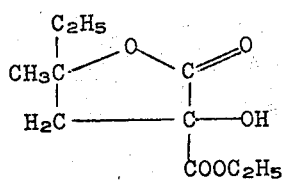

in 50 ml. tetrahydrofuran is added to a slurry of about 8.0 gms. of sodium hydride in 300 ml. tetrahydrofuran and the mixture stirred for 1 hour at 30°–35° C to form a slurry of

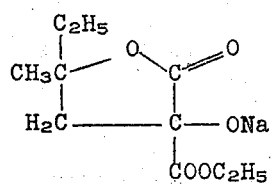

This slurry is cooled to about 10° C and a solution of 56 gms. of ethyl bromoacetate in 50 ml. tetrahydrofuran is added, the temperature being maintained at about 10° C. After 1 hour, the temperature is raised to 25° C and maintained at that level for 18 hours. The tetrahydrofuran is evaporated, the residue diluted with ether and washed with water, dried, and the ether evaporated. The product,

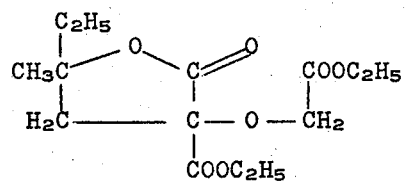

is purified by vacuum distillation.

Treatment of this ester with sodium hydroxide according to the procedures of Example II yields the salt $$HO-\underset{\underset{CH_3}{|}}{\overset{\overset{C_2H_5}{|}}{C}}-CH_2-\underset{\underset{COONa}{|}}{\overset{\overset{COONa}{|}}{C}}-O-CH_2-COONa$$

which is an effective sequestrant.

It will be recognized that other compounds of the invention can be prepared by procedures analogous to those described in Examples I and V. For example, using the epoxide shown in column 1 of Table I below and the α-hydroxy ester salt (if the procedure of Example I is followed) or the α-bromo ester (if the procedure of Example V is followed) shown in column 2 saponifying the ester obtained with sodium hydroxide in accordance with the procedure of Example II will yield the salt shown in column 3.

TABLE I

| EPOXIDE | 2-HYDROXY ESTER SALT OR 2-BROMO ESTER | PRODUCT SALT |
|---|---|---|
| Ph-CH—CH₂ (epoxide) | COOC₂H₅ / NaOCH₂ | HO—CH(Ph)—CH₂—C(COONa)(COONa)—O—CH₂—COONa  and  HO—CH₂—CH(Ph)—C(COONa)—O—CH₂—COONa |
| CH₃—CH—CH₂ (epoxide) | COOC₂H₅ / NaOCH₂ | CH₃—CH(OH)—CH₂—C(COONa)(COONa)—O—CH₂—COONa  and  HO—CH₂—CH(CH₃)—C(COONa)—O—CH₂—COONa |
| CH₃—CH—CH—CH₃ (epoxide) | COOC₂H₅ / NaOCH—CH₃ | CH₃—CH(OH)—CH₂—C(COONa)(COONa)—O—CH(CH₃)—CH₃  and |

TABLE I — Continued

| EPOXIDE | 2-HYDROXY ESTER SALT OR 2-BROMO ESTER | PRODUCT SALT |
|---|---|---|
| | | $$\text{HO-CH}_2\text{-CH(CH}_3\text{)-C(COONa)(COONa)-O-CH(CH}_3\text{)-CH}_3$$ with additional COONa |
| $CH_2\text{—}CH_2$ (epoxide, O bridge) | $\text{COOC}_2\text{H}_5$ / $\text{NaOCH-C}_2\text{H}_5$ | $$\text{HO-CH}_2\text{-CH}_2\text{-C(COONa)(COONa)-O-CH(C}_2\text{H}_5\text{)}$$ with COONa |
| $\text{C}_6\text{H}_5\text{-CH}_2\text{-CH(—O—)CH}_2$ | $\text{COOC}_2\text{H}_5$ / $\text{NaOCH}_2$ | $$\text{HO-CH(CH}_2\text{C}_6\text{H}_5\text{)-CH}_2\text{-C(COONa)(COONa)-O-CH}_2$$ with COONa, <br>and<br> $$\text{HO-CH}_2\text{-CH(CH}_2\text{C}_6\text{H}_5\text{)-C(COONa)(COONa)-O-CH}_2$$ with COONa |
| $\text{C}_4\text{H}_9\text{-O-CH}_2\text{CH(—O—)CH}_2$ | $\text{COOC}_2\text{H}_5$ / $\text{NaOCH}_2$ | $$\text{HO-CH(CH}_2\text{OC}_4\text{H}_9\text{)-CH}_2\text{-C(COONa)(COONa)-O-CH}_2$$ with COONa, <br>and<br> $$\text{HO-CH}_2\text{-CH(CH}_2\text{OC}_4\text{H}_9\text{)-C(COONa)(COONa)-O-CH}_2$$ with COONa |
| $\text{H}_9\text{C}_4\text{CH(—O—)CH}_2$ | $\text{COOC}_2\text{H}_5$ / $\text{NaOCH}_2$ | $$\text{HO-CH(C}_4\text{H}_9\text{)-CH}_2\text{-C(COONa)(COONa)-O-CH}_2$$ with COONa, <br>and<br> $$\text{HO-CH}_2\text{-CH(C}_4\text{H}_9\text{)-C(COONa)(COONa)-O-CH}_2$$ with COONa |

TABLE I — Continued

| EPOXIDE | 2-HYDROXY ESTER SALT OR 2-BROMO ESTER | PRODUCT SALT |
|---|---|---|
| $CH_3-\underset{\underset{O}{\diagdown\diagup}}{\overset{CH_3}{C}}-CH_2$ | $\underset{NaOCH_2}{COOC_2H_5}$ | $HO-\underset{\underset{CH_3}{\mid}}{\overset{\overset{CH_3}{\mid}}{C}}-CH_2-\underset{\underset{COONa}{\mid}}{\overset{\overset{COONa}{\mid}}{C}}-O-CH_2-COONa$ <br>and<br> $HO-CH_2-\underset{\underset{CH_3}{\mid}}{\overset{\overset{CH_3}{\mid}}{C}}-\underset{\underset{COONa}{\mid}}{\overset{\overset{COONa}{\mid}}{C}}-O-CH_2-COONa$ |
| $H_{11}C_5CH-CH_2$ (epoxide) | $\underset{NaOCH_2}{COOC_2H_5}$ | $HO-\underset{}{CH}\underset{\underset{}{\overset{C_5H_{11}}{\mid}}}{}-CH_2-\underset{\underset{COONa}{\mid}}{\overset{\overset{COONa}{\mid}}{C}}-O-CH_2-COONa$ <br>and<br> $HO-CH_2-\underset{\underset{}{\overset{C_5H_{11}}{\mid}}}{CH}-\underset{\underset{COONa}{\mid}}{\overset{\overset{COONa}{\mid}}{C}}-O-CH_2-COONa$ |
| $H_3COCH_2CH-CH_2$ (epoxide) | $\underset{NaOCH_2}{COOC_2H_5}$ | $HO-\underset{\underset{}{\overset{H_3COCH_2}{\mid}}}{CH}-CH_2-\underset{\underset{COONa}{\mid}}{\overset{\overset{COONa}{\mid}}{C}}-O-CH_2-COONa$ <br>and<br> $HO-CH_2-\underset{\underset{}{\overset{H_3COCH_2}{\mid}}}{CH}-\underset{\underset{COONa}{\mid}}{\overset{\overset{COONa}{\mid}}{C}}-O-CH_2-COONa$ |
| $H_{21}C_{10}OCH-CH_2$ (epoxide) | $\underset{NaOCH_2}{COOC_2H_5}$ | $HO-\underset{\underset{}{\overset{C_{10}H_{21}}{\mid}}}{CH}-CH_2-\underset{\underset{COONa}{\mid}}{\overset{\overset{COONa}{\mid}}{C}}-O-CH_2-COONa$ <br>and<br> $HO-CH_2-\underset{\underset{}{\overset{C_{10}H_{21}}{\mid}}}{CH}-\underset{\underset{COONa}{\mid}}{\overset{\overset{COONa}{\mid}}{C}}-O-CH_2-COONa$ |
| $C_6H_5-CH-CH_2$ (epoxide) | $\underset{NaOCHCH_3}{COOC_2H_5}$ | $HO-\underset{\underset{}{\overset{C_6H_5}{\mid}}}{CH}-CH_2\underset{\underset{COONa}{\mid}}{\overset{\overset{COONa}{\mid}}{C}}-O-CHCH_3$ <br>and<br> $HO-CH_2-\underset{\underset{}{\overset{C_6H_5}{\mid}}}{CH}-\underset{\underset{COONa}{\mid}}{\overset{\overset{COONa}{\mid}}{C}}-O-CHCH_3$ |

TABLE I — Continued

| EPOXIDE | 2-HYDROXY ESTER SALT OR 2-BROMO ESTER | PRODUCT SALT |
|---|---|---|
| $C_4H_9O-CH_2-CH\underset{O}{-}CH_2$ | $COOC_2H_5$ <br> $NaOCHCH_3$ | $\underset{HOCH-CH_2-\underset{COONa}{\overset{COONa}{C}}-O-CHCH_3}{H_9C_4OCH_2\quad COONa\quad COONa}$ <br><br> and <br><br> $\underset{HOCH_2-CH-\underset{COONa}{\overset{COONa}{C}}-O-CHCH_3}{H_9C_4OCH_2\quad COONa\quad COONa}$ |
| $H_3COCH_2-CH\underset{O}{-}CH_2$ | $COOC_2H_5$ <br> $NaOCHCH_3$ | $\underset{HO-CH-CH_2-\underset{COONa}{\overset{COONa}{C}}-O-CHCH_3}{CH_2OCH_2\quad COONa\quad COONa}$ <br><br> and <br><br> $\underset{HO-CH_2-CH-\underset{COONa}{\overset{COONa}{C}}-O-CHCH_3}{CH_2OCH_2\quad COONa\quad COONa}$ |
| $H_{21}C_{10}OCH\underset{O}{-}CH_2$ | $COOC_2H_5$ <br> $NaOCHCH_3$ | $\underset{HOCH-CH_2-\underset{COONa}{\overset{COONa}{C}}-O-CHCH_3}{C_{10}H_{21}\quad COONa\quad COONa}$ <br><br> and <br><br> $\underset{HOCH_2-CH-\underset{COONa}{\overset{COONa}{C}}-O-CHCH_3}{C_{10}H_{21}\quad COONa\quad COONa}$ |
| $\underset{CH_3-\underset{\underset{O}{\diagdown}}{\overset{CH_3}{C}}-CH_2}{}$ | $COOC_2H_5$ <br> $NaOCHCH_3$ | $\underset{HO-\underset{CH_3}{\overset{CH_3}{C}}-CH_2-\underset{COONa}{\overset{COONa}{C}}-O-CHCH_3}{}$ <br><br> and <br><br> $\underset{HO-CH_2-\underset{CH_3}{\overset{CH_3}{C}}-\underset{COONa}{\overset{COONa}{C}}-O-CHCH_3}{}$ |
| $\underset{CH_3-\underset{\underset{O}{\diagdown}}{\overset{CH_3}{C}}-\overset{CH_3}{CH}}{}$ | $COOC_2H_5$ <br> $BrCH_2$ | $\underset{HO-\underset{CH_3}{\overset{CH_3}{C}}-\underset{H}{\overset{CH_3}{C}}-\underset{COONa}{\overset{COONa}{C}}-O-CH_2}{}$ <br><br> and |

TABLE I – Continued

| EPOXIDE | 2-HYDROXY ESTER SALT OR 2-BROMO ESTER | PRODUCT SALT |
|---|---|---|
| | | $\begin{array}{c} \text{CH}_3 \quad \text{CH}_3 \quad \text{COONa} \quad \text{COONa} \\ \text{HO}-\text{C}-\text{C}-\text{C}-\text{O}-\text{CH}_2 \\ \text{H} \quad \text{CH}_3 \quad \text{COONa} \end{array}$ |
| $\text{H}_9\text{C}_4\text{CH}\underset{\text{O}}{\overset{}{\diagdown\diagup}}\text{CHCH}_3$ | $\begin{array}{c} \text{COOC}_2\text{H}_5 \\ \mid \\ \text{BrCH}_2 \end{array}$ | $\begin{array}{c} \text{C}_4\text{H}_9 \quad \text{CH}_3 \quad \text{COONa} \quad \text{COONa} \\ \text{HOCH}-\text{CH}-\text{C}-\text{O}-\text{CH}_2 \\ \mid \\ \text{COONa} \end{array}$ and $\begin{array}{c} \text{CH}_3 \quad \text{C}_4\text{H}_9 \quad \text{COONa} \quad \text{COONa} \\ \text{HOCH}-\text{CH}-\text{C}-\text{O}-\text{CH}_2 \\ \mid \\ \text{COONa} \end{array}$ |
| $\text{H}_{11}\text{C}_5\text{CH}\underset{\text{O}}{\overset{}{\diagdown\diagup}}\text{CH}-\text{C}_5\text{H}_{11}$ | $\begin{array}{c} \text{COOC}_2\text{H}_5 \\ \mid \\ \text{BrCH}_2 \end{array}$ | $\begin{array}{c} \text{C}_5\text{H}_{11} \quad \text{C}_5\text{H}_{11} \quad \text{COONa} \quad \text{COONa} \\ \text{HO}-\text{CH}-\text{CH}-\text{C}-\text{O}-\text{CH}_2 \\ \mid \\ \text{COONa} \end{array}$ |
| $\text{H}_9\text{C}_4\text{CH}\underset{\text{O}}{\overset{}{\diagdown\diagup}}\text{CHCH}_3$ | $\begin{array}{c} \text{COOC}_2\text{H}_5 \\ \mid \\ \text{BrCHCH}_3 \end{array}$ | $\begin{array}{c} \text{C}_4\text{H}_9 \quad \text{CH}_3 \quad \text{COONa} \quad \text{COONa} \\ \text{HO}-\text{CH}-\text{CH}-\text{C}-\text{O}-\text{CHCH}_3 \\ \mid \\ \text{COONa} \end{array}$ and $\begin{array}{c} \text{CH}_3 \quad \text{C}_4\text{H}_9 \quad \text{COONa} \quad \text{COONa} \\ \text{HO}-\text{CH}-\text{CH}-\text{C}-\text{O}-\text{CHCH}_3 \\ \mid \\ \text{COONa} \end{array}$ |
| $\text{H}_9\text{C}_4\text{CH}\underset{\text{O}}{\overset{}{\diagdown\diagup}}\text{CHC}_2\text{H}_5$ | $\begin{array}{c} \text{COOC}_2\text{H}_5 \\ \mid \\ \text{BrCH}_2 \end{array}$ | $\begin{array}{c} \text{C}_4\text{H}_9 \quad \text{C}_2\text{H}_5 \quad \text{COONa} \quad \text{COONa} \\ \text{HO}-\text{CH}-\text{CH}-\text{C}-\text{O}-\text{CH}_2 \\ \mid \\ \text{COONa} \end{array}$ and $\begin{array}{c} \text{C}_2\text{H}_5 \quad \text{C}_4\text{H}_9 \quad \text{COONa} \quad \text{COONa} \\ \text{HO}-\text{CH}-\text{CH}-\text{C}-\text{O}-\text{CH}_2 \\ \mid \\ \text{COONa} \end{array}$ |
| $\text{C}_6\text{H}_5-\text{O}-\text{CH}_2\text{CH}\underset{\text{O}}{\overset{}{\diagdown\diagup}}\text{CH}_2$ | $\begin{array}{c} \text{COOC}_2\text{H}_5 \\ \mid \\ \text{NaCCH}_2 \end{array}$ | $\begin{array}{c} \text{CH}_2-\text{O}-\text{C}_6\text{H}_5 \quad \text{COONa} \quad \text{COONa} \\ \text{HO}-\text{CH}-\text{CH}_2-\text{C}-\text{O}-\text{CH}_2 \\ \mid \\ \text{COONa} \end{array}$ and $\begin{array}{c} \text{CH}_2-\text{O}-\text{C}_6\text{H}_5 \quad \text{COONa} \quad \text{COONa} \\ \text{HO}-\text{CH}_2-\text{CH}-\text{C}-\text{O}-\text{CH}_2 \\ \mid \\ \text{COONa} \end{array}$ |

TABLE I – Continued

| EPOXIDE | 2-HYDROXY ESTER SALT OR 2-BROMO ESTER | PRODUCT SALT |
|---|---|---|
| $CH_3CH \!-\!\!-\! CH_2$ with O bridge | $COOC_2H_5$ / $NaOCHC_2H_5$ | $\underset{\underset{COONa}{\mid}}{HO-CH(CH_3)-CH_2-C}-O-CHC_2H_5$ with $COONa$, $COOC_2H_5$ substituents<br><br>and<br><br>$HO-CH_2-CH(CH_3)-\underset{\underset{COONa}{\mid}}{C}-O-CHC_2H_5$ with $COONa$, $COONa$ |
| $\underset{CH}{\overset{COOC_2H_5}{\mid}}\!-\!\!-\!CH_2$ with O bridge | $COOC_2H_5$ / $NaOCH_2$ | $HO-\underset{\underset{COONa}{\mid}}{CH(COONa)}-CH_2-\underset{\underset{COONa}{\mid}}{C}-O-CH_2$<br><br>and<br><br>$HO-CH_2-CH(COONa)-\underset{\underset{COONa}{\mid}}{C}-O-CH_2$ with COONa substituents |
| $\underset{CH}{\overset{COOC_2H_5}{\mid}}\!-\!\!-\!CHCH_3$ with O bridge | $COOC_2H_5$ / $NaOCH_2$ | $HO-\underset{\underset{COONa}{\mid}}{CH(COONa)}-CH(CH_3)-\underset{\underset{COONa}{\mid}}{C}-O-CH_2$ with COONa<br><br>and<br><br>$HO-CH(CH_3)-CH(COONa)-\underset{\underset{COONa}{\mid}}{C}-O-CH_2$ with COONa |
| $\underset{CH}{\overset{CH_2-O-CH_3}{\mid}}\!-\!\!-\!CH_2$ with O bridge | $COOC_2H_5$ / $NaOCHC_2H_5$ | $HO-CH(CH_2OCH_3)-CH_2-\underset{\underset{COONa}{\mid}}{C}-O-CHC_2H_5$ with COONa<br><br>and<br><br>$HO-CH_2-CH(CH_2OCH_3)-\underset{\underset{COONa}{\mid}}{C}-O-CHC_2H_5$ with COONa |
| $\underset{\underset{CH_3}{\mid}}{\overset{CH_3}{\mid}}CH-CH-\!\!-\!CH_2$ with O bridge | $COOC_2H_5$ / $BrCH_2$ | $CH_3-CH(CH_3)\; HO-CH-CH_2-\underset{\underset{COONa}{\mid}}{C}-O-CH_2$ with COONa, COONa<br><br>and |

TABLE I — Continued

| EPOXIDE | 2-HYDROXY ESTER SALT OR 2-BROMO ESTER | PRODUCT SALT |
|---|---|---|
| | | $$\begin{array}{c}CH_3-CH-CH_3 \quad COONa \quad COONa\\ | \quad\quad\quad\quad | \quad\quad |\\ HO-CH_2-CH\;\;\;\;\;\;\;C-O-CH_2\\ \quad\quad\quad\quad\quad\quad\quad\quad |\\ \quad\quad\quad\quad\quad\quad\quad\quad COONa\end{array}$$ |
| $$\begin{array}{c}CH_3 \;\;\; CH_3\\ | \quad\quad |\\ CH-C\!\!-\!\!\!\diagdown\!\!CH_2\\ | \quad\quad\diagup\\ CH_3 \;\;\;\; O\end{array}$$ | $$\begin{array}{c}COOC_2H_5\\ |\\ BrCH_2\end{array}$$ | $$\begin{array}{c}CH_3-CH-CH_3 \;\; COONa \;\; COONa\\ | \quad\quad\quad | \quad\quad\quad |\\ HO-C-CH_2-C-O-CH_2\\ | \quad\quad\quad\quad\quad\quad |\\ CH_3 \quad\quad\quad COONa\end{array}$$ and $$\begin{array}{c}CH_3-CH-CH_3 \;\; COONa \;\; COONa\\ | \quad\quad\quad\quad\quad\quad | \quad\quad |\\ HO-CH_2-C\;\;\;\;\;\;\;\;C-O-CH_2\\ | \quad\quad\quad\quad\quad |\\ CH_3 \quad\quad\quad COONa\end{array}$$ |
| $$\begin{array}{c}CH_3 \;\;\; CH_3\\ | \quad\quad |\\ C\!-\!\!\!\diagdown\!\!\;\;\;\diagup\!\!-\!C\\ \;\;\;\;\;\;\;O\\ | \quad\quad |\\ CH_3 \;\;\; CH_3\end{array}$$ | $$\begin{array}{c}COOC_2H_5\\ |\\ BrCH_2\end{array}$$ | $$\begin{array}{c}CH_3 \;\; CH_3 \;\; COONa \;\; COONa\\ | \quad | \quad\quad | \quad\quad |\\ HO-C-C-C-O-CH_2\\ | \quad | \quad\quad |\\ CH_3 \;\; CH_3 \;\; COONa\end{array}$$ |
| $$\begin{array}{c}(CH_2)_4\\ \diagup\quad\;\diagdown\\ H-C\!-\!\!\!-\!\!C-H\\ \diagdown\!\!\;O\;\!\!\diagup\end{array}$$ | $$\begin{array}{c}COOC_2H_5\\ |\\ Br-CH_2\end{array}$$ | $$\begin{array}{c}(CH_2)_4 \quad COONa \quad COONa\\ \diagup\quad\;\diagdown \quad\quad\; | \quad\quad\quad |\\ HO-C-C-C-O-CH_2\\ \quad\quad\quad\quad\quad |\\ \quad\quad\quad\quad\quad COONa\end{array}$$ |

All salt products shown in the Table are effective sequestrants.

What is claimed is:

1. Compounds represented by the formula $$\begin{array}{c}COOX\\ |\\ R-O-CH-A\end{array}$$

wherein R is selected from the group consisting of

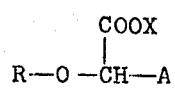

and

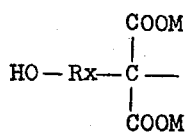

A is selected from the group consisting of hydrogen, methyl and ethyl; M is selected from the group consisting of alkali metal, ammonium, alkyl ammonium containing one to four carbon atoms and alkanol ammonium containing one to four carbon atoms; X is M when R is

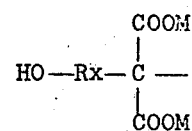

and X is hydrogen or an alkyl group containing from one to 20 carbon atoms when R is

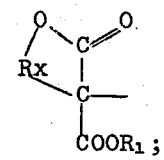

$R_1$ is selected from the group consisting of hydrogen and alkyl groups containing from one to 20 carbon atoms; and $R_x$ is selected from the group consisting of

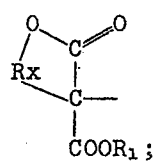

$n$ being an integer from 4 to 10, and

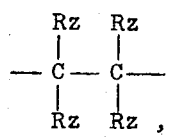

Rz being selected from the group consisting of hydrogen, alkyl, phenyl, phenyl alkyl, alkoxy alkyl, alkoxy phenyl, alkoxy phenyl alkyl and COOX, the total number of carbon atoms in Rx being from two to 22.

2. Compounds according to claim 1 wherein Rx is

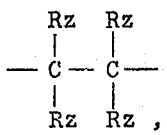

and one Rz substituent on a carbon not attached to an hydroxy group or a heterocyclic oxygen is hydrogen and the remaining Rz substituents are hydrogen or alkyl groups containing from one to 20 carbon atoms.

3. Compounds according to claim 2 wherein all Rz substituents are hydrogen.

4. A compound according to claim 3 wherein A is hydrogen.

5. A compound represented by the formula

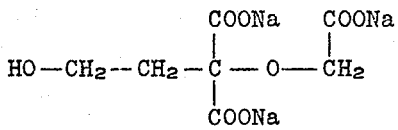

* * * * *